United States Patent
Munshi et al.

(10) Patent No.: US 10,094,285 B2
(45) Date of Patent: Oct. 9, 2018

(54) GAS TURBINE OUTER CASE ACTIVE AMBIENT COOLING INCLUDING AIR EXHAUST INTO SUB-AMBIENT CAVITY

(71) Applicants: Mrinal Munshi, Orlando, FL (US); John W. Finneran, Palm Beach Gardens, FL (US); Yevgeniy Shteyman, West Palm Beach, FL (US); Daryl J. Graber, Palm Beach Gardens, FL (US); Matthew R. Porter, West Palm Beach, FL (US); Jonathan M. Leagon, Cassatt, SC (US)

(72) Inventors: Mrinal Munshi, Orlando, FL (US); John W. Finneran, Palm Beach Gardens, FL (US); Yevgeniy Shteyman, West Palm Beach, FL (US); Daryl J. Graber, Palm Beach Gardens, FL (US); Matthew R. Porter, West Palm Beach, FL (US); Jonathan M. Leagon, Cassatt, SC (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 1422 days.

(21) Appl. No.: 13/746,447

(22) Filed: Jan. 22, 2013

(65) Prior Publication Data
US 2014/0286763 A1  Sep. 25, 2014

Related U.S. Application Data

(63) Continuation-in-part of application No. 13/314,311, filed on Dec. 8, 2011, now Pat. No. 8,894,359.

(51) Int. Cl.
*F01D 9/06* (2006.01)
*F01D 25/14* (2006.01)
(Continued)

(52) U.S. Cl.
CPC .............. *F02C 7/12* (2013.01); *F01D 9/065* (2013.01); *F01D 25/12* (2013.01); *F01D 25/145* (2013.01);
(Continued)

(58) Field of Classification Search
CPC . F01D 9/04; F01D 9/065; F01D 25/14; F01D 25/145; F01D 25/162
(Continued)

(56) References Cited

U.S. PATENT DOCUMENTS 2,402,841 A * 6/1946 Ray .................... F01D 11/24
                                                  415/116
3,034,298 A    5/1962 White
(Continued)

FOREIGN PATENT DOCUMENTS

CN  101743391 A1  7/2009
CN  101978138 A   10/2009
(Continued)

*Primary Examiner* — Sean J Younger

(57) ABSTRACT

A gas turbine engine including an outer case and an exhaust gas passage defined within the outer case for conducting an exhaust gas flow from a turbine section of the gas turbine engine. A cooling channel is associated with an outer surface of the outer case, the cooling channel having a channel inlet and a channel outlet. An air duct structure is provided and includes an inlet end in fluid communication with the channel outlet and includes an outlet end in fluid communication with an area of reduced pressure relative to the air duct structure inlet end. An exit cavity is located at the air duct structure outlet end, wherein the exit cavity effects a reduced pressure at the outlet end to draw air from the cooling channel into the air duct.

18 Claims, 10 Drawing Sheets

(51) Int. Cl.
*F01D 25/16* (2006.01)
*F02C 7/12* (2006.01)
*F01D 25/12* (2006.01)
*F01D 25/30* (2006.01)

(52) U.S. Cl.
CPC ........... *F01D 25/162* (2013.01); *F01D 25/30* (2013.01); *F05D 2240/128* (2013.01); *F05D 2240/15* (2013.01)

(58) Field of Classification Search
USPC ......... 415/142, 170.1, 175, 177, 178, 213.1, 415/229
See application file for complete search history.

(56) References Cited

U.S. PATENT DOCUMENTS

| | | | |
|---|---|---|---|
| 3,058,302 A | 10/1962 | Kuzyk | |
| 3,077,074 A | 2/1963 | Collman et al. | |
| 4,156,342 A * | 5/1979 | Korta | F01D 25/08 184/104.3 |
| 4,355,507 A * | 10/1982 | Coffey | F02K 1/822 110/157 |
| 4,369,016 A | 1/1983 | Dennison | |
| 4,979,872 A | 12/1990 | Myers et al. | |
| 4,987,736 A * | 1/1991 | Ciokajlo | F01D 9/065 415/138 |
| 4,989,406 A | 2/1991 | Vdoviak et al. | |
| 5,201,846 A | 4/1993 | Sweeney | |
| 5,273,397 A | 12/1993 | Czachor et al. | |
| 5,292,227 A | 3/1994 | Czachor et al. | |
| 5,388,960 A * | 2/1995 | Suzuki | F01D 25/26 415/108 |
| 5,593,274 A | 1/1997 | Carreno et al. | |
| 5,628,182 A | 5/1997 | Mowill | |
| 5,669,812 A * | 9/1997 | Schockemoehl | F01D 25/30 285/187 |
| 5,680,767 A | 10/1997 | Lee et al. | |
| 5,980,201 A * | 11/1999 | Benoist | F01D 25/14 415/115 |
| 6,035,929 A * | 3/2000 | Friedel | F01D 11/24 165/168 |
| 6,122,917 A | 9/2000 | Senior | |
| 6,146,090 A | 11/2000 | Schmidt | |
| 6,149,074 A * | 11/2000 | Friedel | F01D 11/24 165/169 |
| 6,266,954 B1 | 7/2001 | McCallum et al. | |
| 6,295,803 B1 | 10/2001 | Bancalari | |
| 6,379,108 B1 | 4/2002 | Schmidt | |
| 6,478,534 B2 * | 11/2002 | Bangert | F01D 25/12 415/1 |
| 6,584,766 B1 * | 7/2003 | Czachor | F01D 25/30 239/127.1 |
| 7,040,097 B2 | 5/2006 | Mukherjee | |
| 7,329,084 B2 * | 2/2008 | Dittmann | F01D 25/12 415/1 |
| 7,373,773 B2 * | 5/2008 | Noda | F01D 5/081 60/266 |
| 7,493,769 B2 | 2/2009 | Jangili | |
| 7,682,130 B2 * | 3/2010 | Jurjevic | F01D 25/12 415/108 |
| 2006/0073010 A1 | 4/2006 | Busekros et al. | |
| 2010/0068043 A1 | 3/2010 | Shteyman et al. | |
| 2010/0272558 A1 * | 10/2010 | Black | F01D 25/28 415/142 |
| 2011/0005234 A1 * | 1/2011 | Hashimoto | F01D 25/30 60/796 |
| 2011/0020116 A1 * | 1/2011 | Hashimoto | F01D 9/065 415/180 |
| 2012/0121408 A1 | 5/2012 | Lee et al. | |

FOREIGN PATENT DOCUMENTS

| | | |
|---|---|---|
| CN | 102678334 A | 9/2012 |
| EP | 0344877 A1 | 12/1989 |
| EP | 2187019 A1 | 5/2010 |
| EP | 2261468 A1 | 12/2010 |
| JP | 2007192028 A | 8/2007 |
| JP | 2009203871 A | 9/2009 |
| JP | 2010229920 A | 10/2010 |
| SU | 333279 A1 | 3/1972 |

* cited by examiner

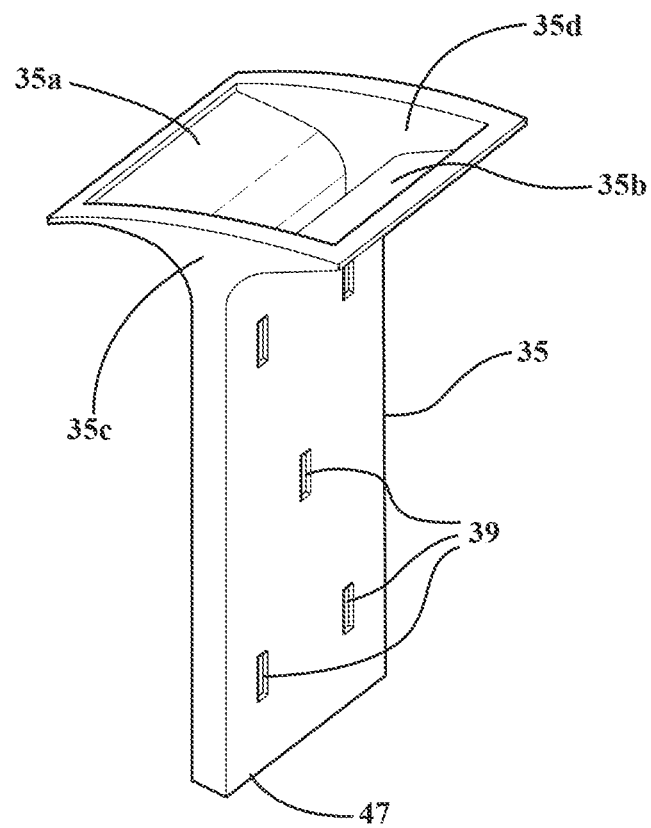
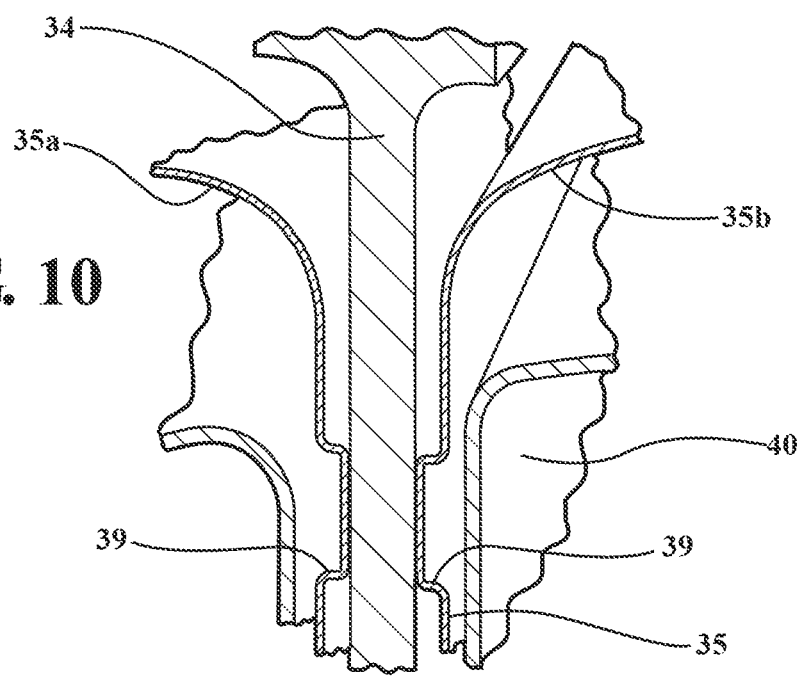

GAS TURBINE OUTER CASE ACTIVE AMBIENT COOLING INCLUDING AIR EXHAUST INTO SUB-AMBIENT CAVITY

CROSS-REFERENCE TO RELATED APPLICATIONS

This application is a continuation-in-part of and claims priority to U.S. patent application Ser. No. 13/314,311, filed Dec. 8, 2011, which application is herein incorporated by reference in its entirety as if fully set forth herein.

FIELD OF THE INVENTION

The present invention relates to gas turbine engines and, more particularly, to structures for providing thermal protection to limit heating of the outer case of a gas turbine engine.

BACKGROUND OF THE INVENTION

A gas turbine engine generally includes a compressor section, a combustor section, a turbine section and an exhaust section. In operation, the compressor section may induct ambient air and compress it. The compressed air from the compressor section enters one or more combustors in the combustor section. The compressed air is mixed with the fuel in the combustors, and the air-fuel mixture can be burned in the combustors to form a hot working gas. The hot working gas is routed to the turbine section where it is expanded through alternating rows of stationary airfoils and rotating airfoils and used to generate power that can drive a rotor. The expanded gas exiting the turbine section may then be exhausted from the engine via the exhaust section.

In a typical gas turbine engine, bleed air comprising a portion of the compressed air obtained from one or more stages of the compressor may be used as cooling air for cooling components of the turbine section. Additional bleed air may also be supplied to portions of the exhaust section, such as to cool portions of the exhaust section and maintain a turbine exhaust case below a predetermined temperature through a forced convection air flow provided within an outer casing of the engine. Advancements in gas turbine engine technology have resulted in increasing temperatures, and associated outer case deformation due to thermal expansion. Case deformation may increase stresses in the case and in components supported on the case within the engine, such as bearing support struts. The additional stress, which may operate in combination with low cycle fatigue, may contribute to cracks, fractures or failures of the bearing support struts that are mounted to the casing for supporting an exhaust end bearing housing.

SUMMARY OF THE INVENTION

In accordance with an aspect of the present invention, a gas turbine engine is provided comprising an outer case defining a central longitudinal axis, and an surface of the outer case extending circumferentially around the central longitudinal axis. An exhaust gas passage is defined within the outer case for conducting an exhaust gas flow from a turbine section of the gas turbine engine. A cooling channel is associated with the outer surface of the outer case, the cooling channel having a channel inlet and a channel outlet. An air duct structure is provided and includes an inlet end in fluid communication with the channel outlet and includes an outlet end in fluid communication with an area of reduced pressure relative to the air duct structure inlet end. An exit cavity is located at the air duct structure outlet end, wherein the exit cavity effects a reduced pressure at the outlet end to draw air from the cooling channel into the air duct.

The air duct structure may comprise a passage extending from an inner surface of the outer case to a location of the exit cavity radially inwardly of the exhaust gas passage.

A strut may extend radially inwardly from the inner surface of the outer case, and the air duct structure may be defined by a radiation shield extending around the strut and attached to the inner surface of the outer case.

Openings through the outer case may define the cooling channel outlet for conducting ambient air from the outer surface of the outer case to the air duct structure.

The cooling channel may be defined between the outer case exterior surface and a panel structure supported on the outer case, and ambient air may pass through the panel structure and enter the cooling channel.

The panel structure may comprise plural panel sections with axially extending gaps defined between adjacent panel sections at spaced circumferential locations, wherein the gaps permit passage of ambient air into the channel portion.

Openings may be provided through the outer case to define the cooling channel outlet for conducting ambient air from the outer surface of the outer case to the air duct structure.

A thermal barrier/cooling system may be provided for controlling a temperature of the outer case, the thermal barrier/cooling system including:

an internal insulating layer supported on an inner surface of the outer case opposite the outer surface of the outer case, the internal insulating layer extending circumferentially along the inner surface of the outer case and providing a thermal resistance to radiated energy from the exhaust gas passage located radially inwardly from the outer case; and the cooling channel defined by a panel structure located in radially spaced relation to the outer surface of the outer case and extending around the circumference of the outer surface of the outer case, the convective cooling channel being generally axially aligned with the internal insulating layer and forming a flow path for an ambient air flow cooling the outer surface of the outer case.

An external insulating layer may be supported on and cover the panel structure.

The outer case may comprise a turbine exhaust case, and may include an exhaust diffuser defining the exhaust gas passage at the axial location of the internal insulating layer.

In accordance with another aspect of the invention, a gas turbine engine is provided including an exhaust section comprising an outer case defining a central longitudinal axis, and an outer case exterior surface extending circumferentially around the central longitudinal axis. An exhaust duct is located within the outer case and is defined between an outer duct wall and an inner duct wall, and the exhaust duct defines a passage for hot exhaust gases exiting a turbine section of the gas turbine engine. A rear bearing housing is located radially inward from the inner duct wall, and a strut extends from the outer case to the bearing housing to support the bearing housing. A shield structure surrounds the strut to shield the strut from the exhaust gases. An air opening is formed through the outer case exterior surface, the air opening being in fluid communication with a radial passage extending between the strut and a portion of the shield structure. A disk cavity is located adjacent a stage of the turbine section and is in fluid communication with the radial passage. The disk cavity is at a pressure lower than an ambient air pressure outside of the turbine engine for effecting a flow of ambient air through the air opening into the disk cavity.

The shield structure may include a strut shield surrounding the strut and a radiation shield located between the strut shield and the strut.

The radial passage may be defined by an interior surface of the radiation shield and an exterior surface of the strut.

The radiation shield may extend through an annular space defined between the outer duct wall and the outer case.

The radiation shield may include a radially outer end attached to an interior surface of the outer case and surrounding the air opening.

A tunnel cavity may be defined radially inward from the inner duct wall and located downstream from the disk cavity, the tunnel cavity receiving the ambient air prior to the ambient air entering the disk cavity.

A cooling channel may be defined between the outer case exterior surface and a panel structure supported on the outer case, and ambient air entering the air opening passes through the panel structure and into the cooling channel.

The cooling channel may extend circumferentially around the exhaust case, and the panel structure may comprise plural panel sections with axially extending gaps defined between adjacent panel sections at spaced circumferential locations, the gaps permitting passage of ambient air into the channel portion.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 9 is an enlarged cut-away perspective view of a portion of the strut structure illustrating dimples formed in the radiation shield of the strut structure;

FIG. 10 is a perspective view of the radiation shield;

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
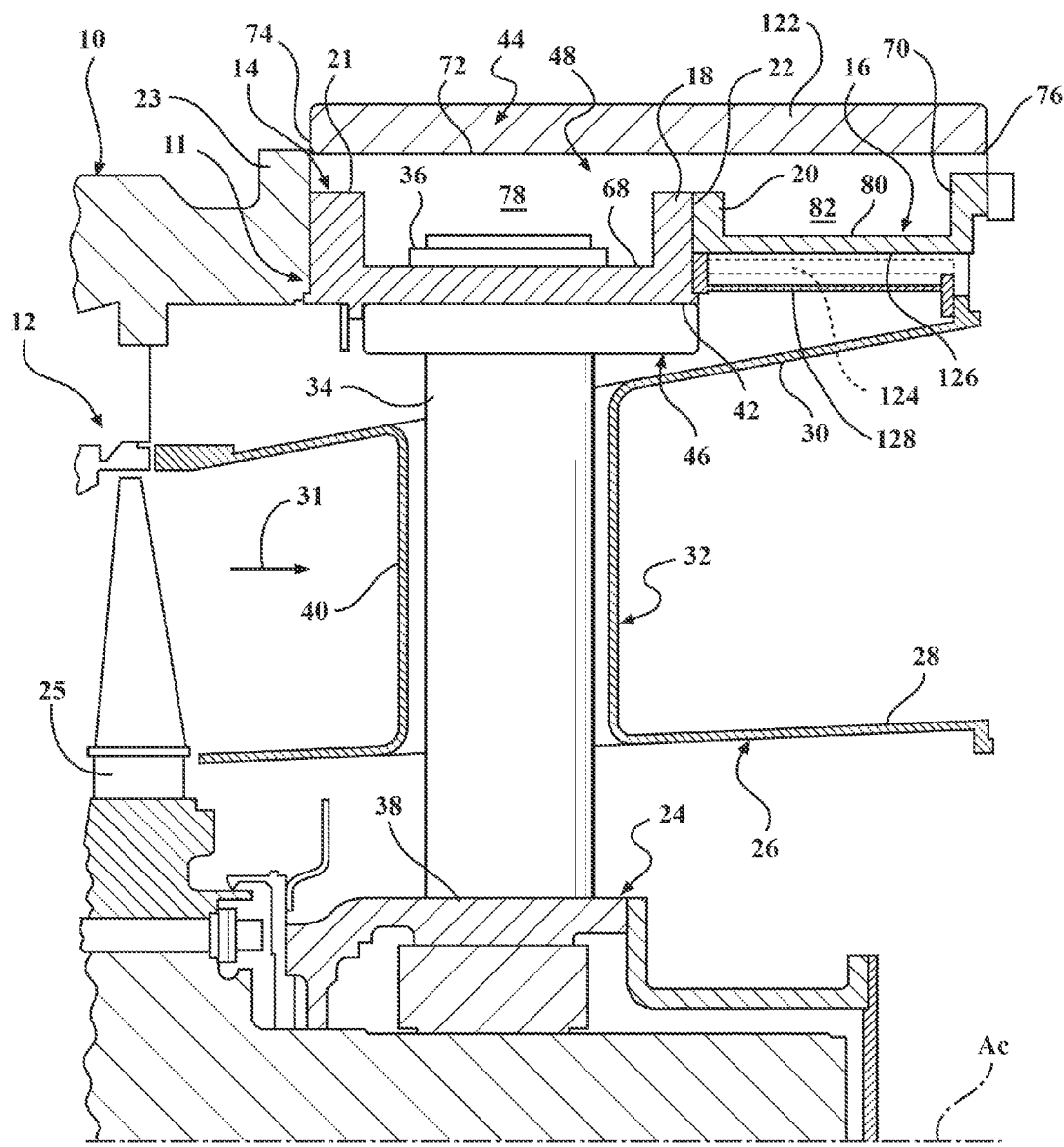
FIG. 1 is a cross-sectional elevational view through a portion of a gas turbine engine including an exhaust section illustrating aspects of the present invention.

Referring to FIG. 1, a portion of an exhaust section 10 of a gas turbine engine is shown located axially downstream from a turbine section 12 to illustrate aspects of the present invention. The exhaust section 10 generally comprises a cylindrical structure comprising an outer case 11 extending circumferentially around a generally horizontal central longitudinal axis $A_C$ and forms a downstream extension of an outer case the gas turbine engine. The outer case 11 of the exhaust section 10 includes an exhaust cylinder or turbine exhaust case 14, and an exhaust spool structure 16 located downstream from the exhaust case 14.

The exhaust case 14 includes a downstream exhaust case flange 18 that extends radially outwardly of a downstream end the exhaust case 14, and the spool structure 16 includes an upstream spool structure flange 20 that extends radially outwardly of the spool structure 16. The downstream exhaust case flange 18 and upstream spool structure flange 20 abut each other at a joint 22, and may be held together in a conventional manner, such as by bolts (not shown). In addition, an upstream exhaust case flange 21 extends radially outwardly from an upstream end of the exhaust case 14 and may be bolted to a radially extending flange 23 of the turbine section 12 for supporting the exhaust case 14 to the turbine section 12.

The exhaust case 14 comprises a relatively thick wall forming a structural member or frame for supporting an exhaust end bearing housing 24 and for supporting at least a portion of an exhaust diffuser 26. The exhaust end bearing housing 24 is located for supporting an end of a rotor 25 for the gas turbine engine.

The diffuser 26 comprises an inner wall 28 and an outer wall 30 defining an annular passage for conveying hot exhaust gases 31 from the turbine section 12. The bearing housing 24 is supported by a plurality of strut structures 32. Each of the strut structures 32 include a strut 34 extending from a connection 36 on the exhaust case 14, through the diffuser 26, to a connection 38 on the bearing housing 24 for supporting and maintaining the bearing housing 24 at a centered location within the exhaust case 14. The strut structures 32 may additionally include a strut shield or fairing 40 surrounding the strut 34 for isolating the strut 34 from the hot exhaust gases 31 passing through the diffuser 26, see also FIG. 3.

As a result of the hot exhaust gases 31 passing through the diffuser 26, the outer wall 30 of the diffuser 26 radiates heat radially outwardly toward an inner case surface 42 of the exhaust case 14. As discussed above, conventional designs for cooling a turbine exhaust section may provide bleed air supplied from a compressor section of the engine to the exhaust section to provide a flow of cooling air between the diffuser and the exhaust case in order to control or reduce the temperature of the exhaust case through forced convection. In accordance with an aspect of the invention, a thermal barrier/cooling system 44 is provided to reduce and/or eliminate the use of compressor bleed air to control the temperature of the exhaust case 14 and spool structure 16.

Figure 2:
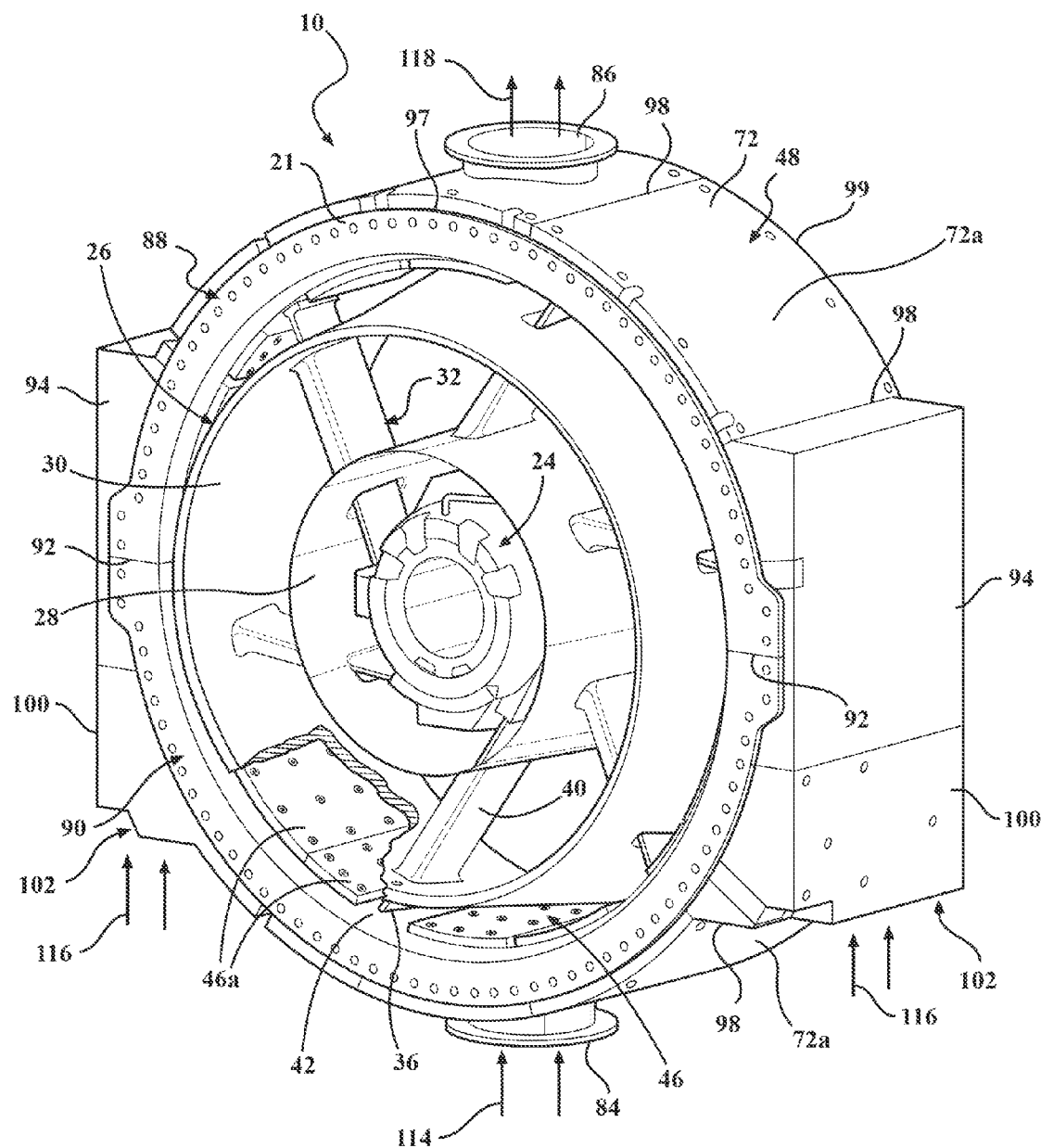
FIG. 2 is a partially cut-away perspective view of the exhaust section illustrating aspects of the present invention.
Figure 3:
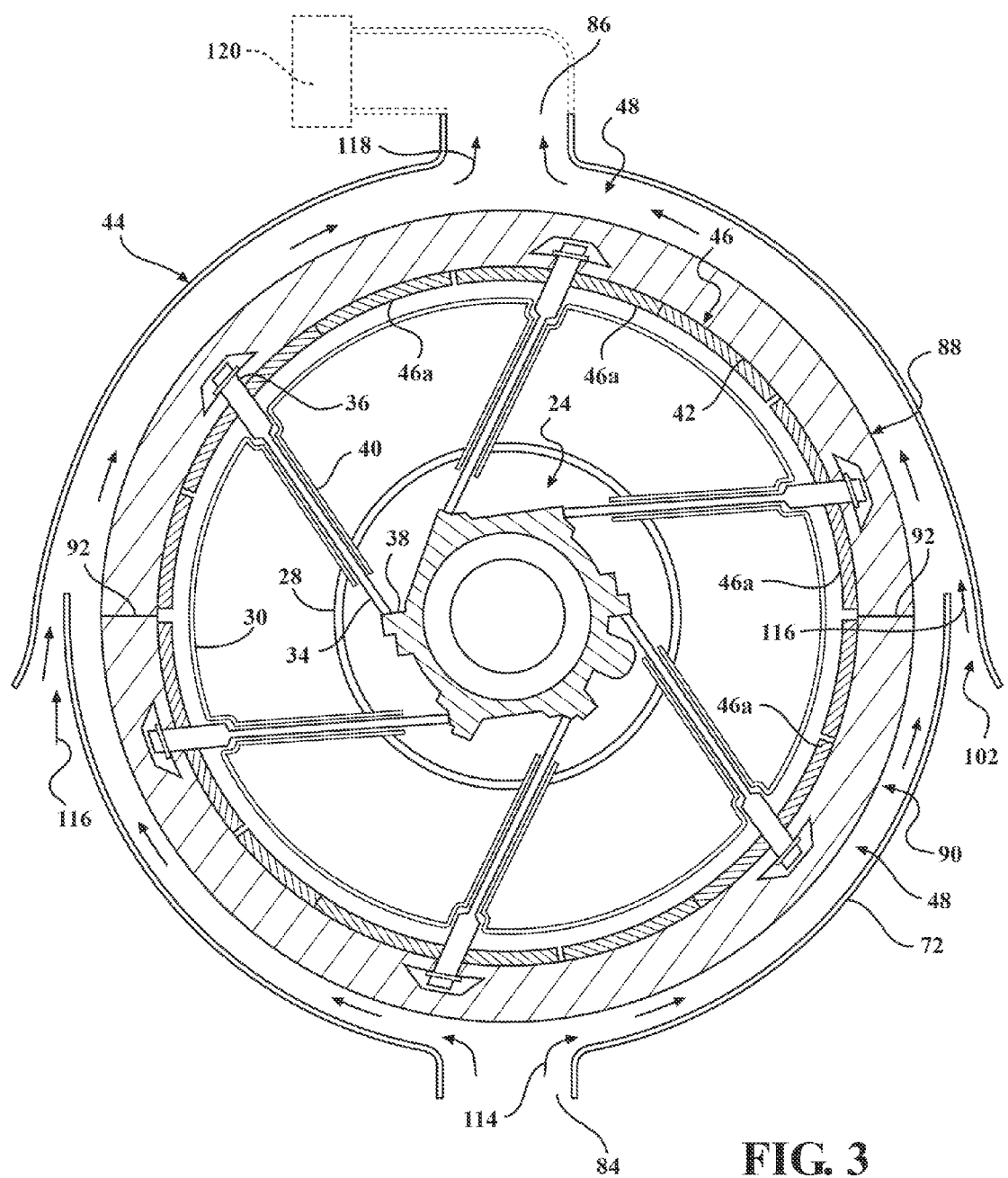
FIG. 3 is a cross-sectional axial view of the exhaust section diagrammatically illustrating air flow provided around an outer case of the gas turbine engine.

Referring to FIGS. 2 and 3, the thermal barrier/cooling system 44 generally comprises an internal insulating layer 46 and a convective cooling channel 48. The internal insulating layer 46 is supported on the inner case surface 42 and extends circumferentially to cover substantially the entire inner case surface 42. The internal insulating layer 46 forms a thermal barrier between the diffuser 26 and the exhaust case 14 to provide a thermal resistance to radiated energy from the outer wall 30 of the diffuser 26.

The internal insulating layer 46 is preferably formed by a plurality of insulating layer segments 46a (FIG. 5) generally located in side-by-side relation to each other, and having a longitudinal or axial extent that is about equal to the axial length of the exhaust case 14 to provide a thermal barrier across substantially the entire inner case surface 42 of the exhaust case 14. Hence, a substantial portion of the radiated heat from the diffuser 26 is prevented from reaching the exhaust case 14, thereby isolating the wall of the exhaust case 14 from the thermal load contained within the exhaust case 14.

Figure 5:
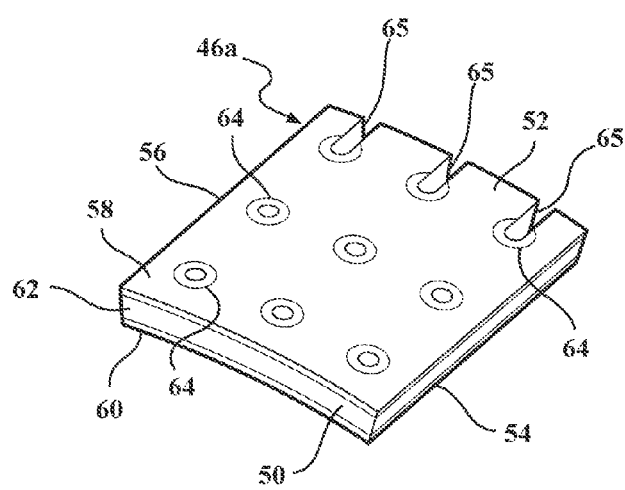
FIG. 5 is a perspective view illustrating an insulating layer segment in accordance with an aspect of the invention.
Figure 6:
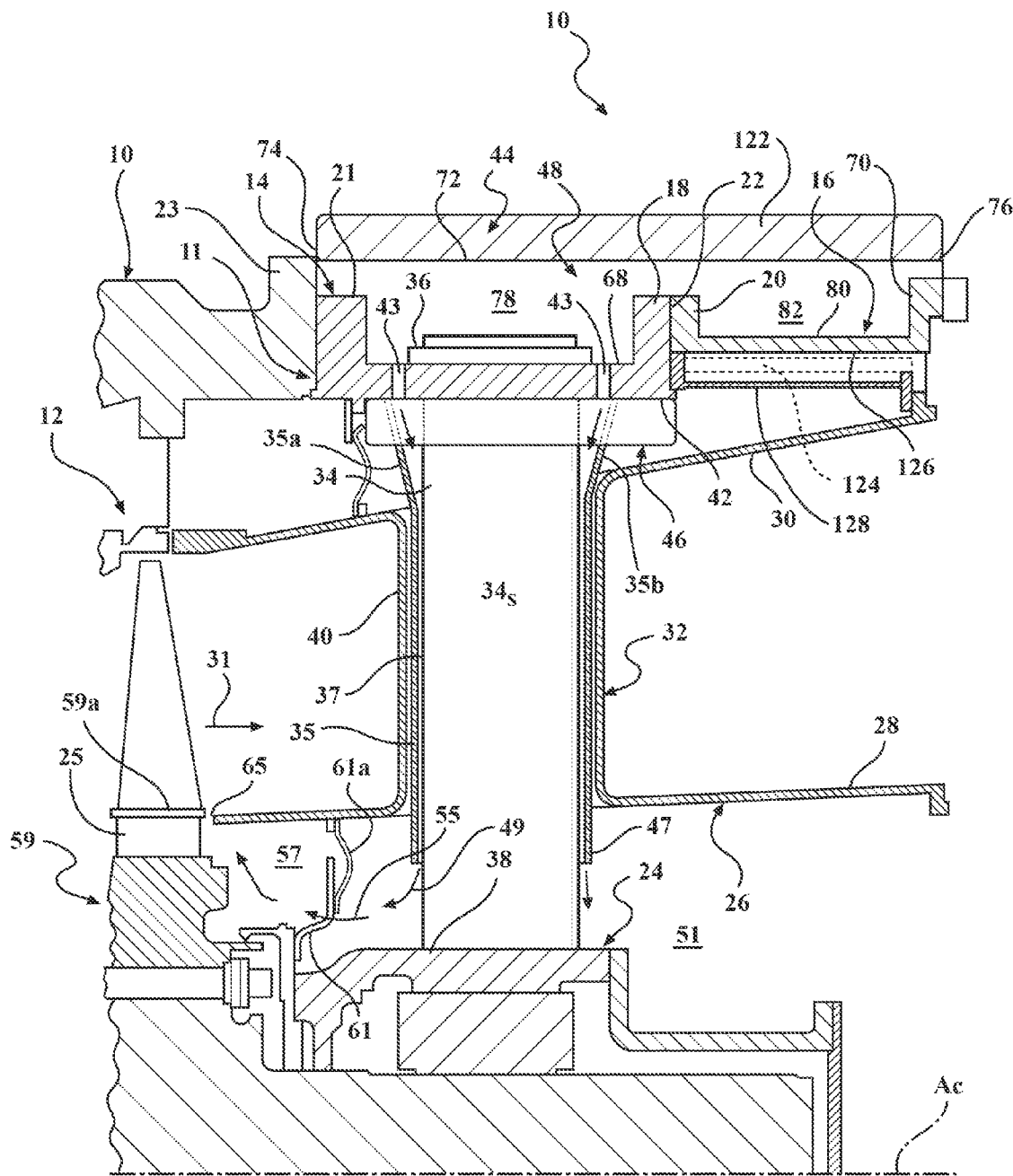
FIG. 6 is a cross-sectional elevational view through a portion of a gas turbine engine including an exhaust section illustrating an additional aspect of the present invention.
Figure 7:
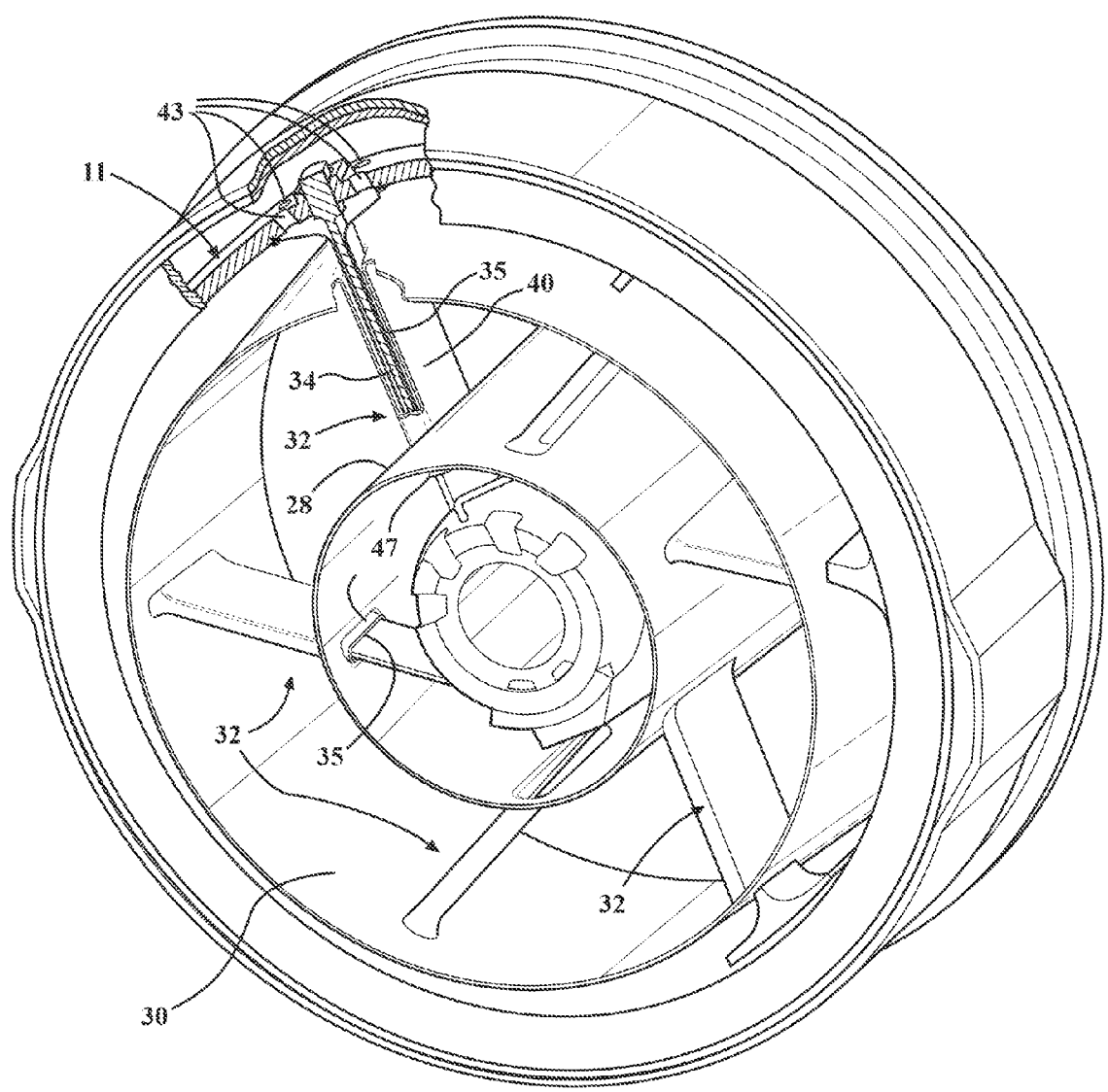
FIG. 7 is a partially cut-away perspective view of the exhaust section illustrating aspects of the present invention shown in FIG. 6.

Referring further to FIG. 5, the insulating layer segments 46a may comprise rectangular segment members having a leading edge 50, a trailing edge 52, and opposing side edges 54, 56. The insulating layer segments 46a have a lower thermal conductivity than that of the wall of the exhaust case 14. The thermal conductivity of the insulating layer segments 46a may have a maximum value of about 0.15 W/m·K, and preferably have a thermal conductivity value of about 0.005 W/m·K for resisting transfer of heat from the diffuser to the engine case 14. The insulating layer segments 46a may positioned on the inner case surface 42 of the exhaust case 14 with the side edges 54, 56 of one insulating layer segment 46a closely adjacent, or engaged with, the side edges 54, 56 of an adjacent insulating layer segment 46a.

The construction of the insulating layer segments 46a may comprise a pair of opposing sheet metal layers 58, 60, and a thermal blanket layer 62 located between the sheet metal layers 58, 60 and having a substantially lower thermal conductivity than the sheet metal layers 58, 60. A plurality of metal bushings 64 may extend through the sheet metal layers 58, 60 and the thermal blanket layer 62 at mounting points for the insulating layer segments 46a. In particular, each of the metal bushings 64 comprise a rigid structure defining a predetermined spacing between the sheet metal layers 58, 60, and are adapted to receive a fastener structure, such as a standoff 66 (FIG. 4), for attaching each insulating layer segment 46a to the exhaust case 14. The standoffs 66 may be configured to permit limited movement of the insulating layer segments 46a relative to the inner case surface 42, such as to provide for any thermal mismatch between the internal insulating layer 46 and the exhaust case 14. For example the standoffs 66 may each comprise a stud 67 having a radially outer end affixed at the inner case surface 42 and having a threaded radially inner end for receiving a nut 69 to retain the insulating layer segment 46a between the nut and the inner case surface 42.

The insulating layer segments 46a may be provided with slots 65 extending from the trailing edge 52 to a rear row of the bushings 64 to facilitate assembly of the insulating layer segments 46a to the exhaust case 14. In particular, the slots 65 facilitate movement of the insulating layer segments 46a onto the studs 67 during assembly by permitting a degree of axial movement of the rear row of bushings 64 onto a corresponding row of studs 67 at a rear portion of the exhaust case 14 where there is a minimal space between the exhaust case 14 and the diffuser 26.

It may be noted that a limited spacing may be provided between adjacent insulating layer segments 46a at particular locations around the inner case surface 42. For example, at the locations of the connections 36 where the struts 34 extend inwardly from the inner case surface 42 a spacing or gap may be provided between adjacent insulating layer segments 46a located adjacent to either side of each strut 34. Similarly, a limited gap may be present between the insulating layer segments 46a that are directly adjacent to structure forming the horizontal joints 92. It may be noted that an alternative configuration of the insulating layer segments 46a may be provided to reduce gaps at these locations. For example, the insulating layer segments 46a may be configured to include portions that extend closely around the struts 34 and thereby reduce gap areas that may expose the inner case surface 42 to radiated heat.

Provision of multiple insulating layer segments 46a facilitates assembly of the internal insulating layer 46 to the engine case 14, and further enables repair of a select portion of the internal insulating layer 46. For example, in the event of damage to a portion of the internal insulating layer 46, the configuration of the internal insulating layer 46 permits removal and replacement of individual ones of the insulating layer segments 46a that may have damage, without requiring replacement of the entire internal insulating layer 46.

It should be understood that although a particular construction of the insulating layer segments 46a has been described, other materials and constructions for the insulating layer segments 46a may be provided. For example, the insulating layer segments 46a may be formed of a known ceramic insulating material configured to provide a thermal resistance for surfaces, such as the inner case surface 42.

Referring to FIG. 1, the convective cooling channel 48 extends circumferentially around an outer case surface 68 of the exhaust case 14, and is generally axially located extending from the upstream exhaust case flange 21 to at least the downstream exhaust case flange 18, and preferably extending to a downstream spool structure flange 70 extending radially outwardly from a downstream end of the spool structure 16. The convective cooling channel 48 is defined by a panel structure 72 that extends from an upstream location 74 where it is affixed to the exhaust section 10 at the upstream exhaust case flange 21 to a downstream location 76 where it is affixed to the exhaust section 10 at the downstream spool structure flange 70. The panel structure 72 is located in radially spaced relation to the outer case surface 68 to define a first cooling channel portion 78 of the convective cooling channel 48, i.e., a recessed area between the upstream exhaust case flange 21 and the downstream exhaust case flange 18. The panel structure 72 is further located in radially spaced relation to an outer surface 80 of the spool structure 16 to define a second cooling channel portion 82 of the convective cooling channel 48, i.e., a recessed area between the upstream spool structure flange 20 and the downstream spool structure flange 70. The first and second cooling channel portions 78, 82 define circumferentially parallel flow paths around the exhaust section 10 and may be in fluid communication with each other across the radially outer ends of the flanges 18, 20.

Figure 2A:
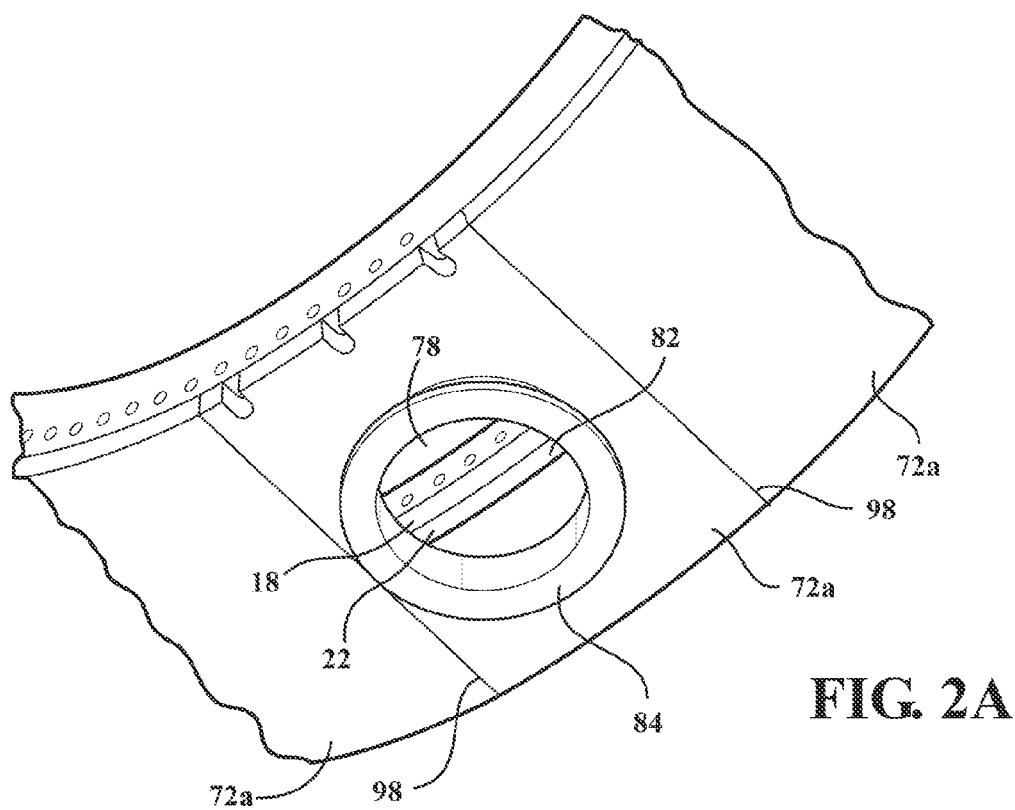
FIG. 2A is a perspective view of a lower portion of the structure illustrated in FIG. 2 illustrating a main air inlet.

Referring to FIGS. 2 and 3, the convective cooling channel 48 includes a main cooling air supply inlet 84 located at a first circumferential location for providing a supply of ambient air to the convective cooling channel 48. The convective cooling channel 48 further includes an exhaust air outlet 86 at a second circumferential location that is diametrically opposite from the first circumferential location. In accordance with a preferred embodiment, the main air supply inlet 84 (FIG. 2A) is located at a bottom-dead-center location of the outer case 11 of the exhaust section 10, and the exhaust air outlet 86 is located at a top-dead-center location of the outer case 11 of the exhaust section 10.

As seen in FIG. 2, the exhaust section 10 may be formed in two halves, i.e., an upper half 88 and a lower half 90, joined together at a horizontal joint 92. In accordance with an aspect of the invention, the panel structure 72 includes enlarged side portions 94 formed as box sections extending across the horizontal joints 92 from locations above and below the horizontal joints 92. The side portions 94 are configured to provide additional clearance for air flow around the horizontal joints 92, and may further be configured to provide an additional air flow to the convective cooling channel 48, as is discussed below.

The panel structure 72 comprises individual panel sections 72a that may be formed of sheet metal, i.e., relatively thin compared to the outer case 11. The panel sections 72a are curved to match the curvature of the outer case 11, and extend downwardly from the side portions 94 toward the main air inlet 84, and extend upwardly from the side portions 94 toward the air outlet 86. The panel sections 72a are formed as generally rectangular sections extending between the upstream and downstream locations 74, 76 on the exhaust section 10, and preferably engage or abut each other, as well as the side portions 94 at shiplap joints 98 along axially extending edges of the panel sections 72a. The panel sections 72a and side portions 94 may be attached to the exhaust section outer case 11 by any conventional means, and are preferably attached as removable components by fasteners, such as bolts or screws. It should be understood that although the enlarged side portions 94 are depicted as box sections, this portion of the panel structure 72 need not be limited to a particular shape and may be any configuration to facilitate passage of air flow past the horizontal joints 92, which typically comprise enlarged and radially outwardly extending flange portions of the exhaust section outer case 11. Further, it should be noted that the main air inlet 84 and the air outlet 86 may incorporated into respective panel sections 72a at respective bottom-dead-center and top-dead-center locations around the panel structure 72.

Figure 2B:
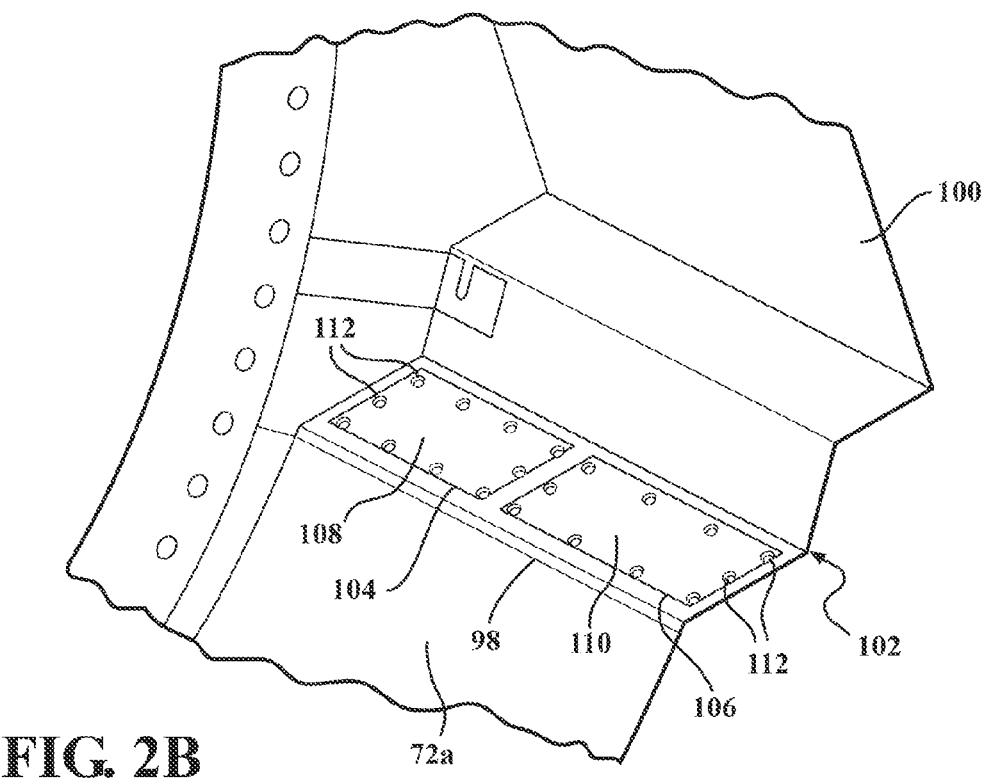
FIG. 2B is a perspective view from a lower side of the structure illustrated in FIG. 2 illustrating auxiliary air inlets.

Referring to FIGS. 2 and 2B, the side portions 94 may be formed with a lower portion 100 extending below the horizontal joints 92 and terminating at a downward facing auxiliary air inlet structure 102. The auxiliary air inlet structure 102 may include first and second auxiliary air inlet openings 104, 106 located side-by-side, each of which is illustrated as a downwardly facing opening in the panel structure 72. The first and second auxiliary air inlet openings 104, 106 may be axially aligned over the first and second channel portions 78, 82, respectively. The auxiliary air inlet openings 104, 106 are shown as being provided with respective cover panels or plates 108, 110 that may be removably attached over the openings with fasteners 112, such as bolts or screws. One or both of the cover plates 108, 110 may be displaced or removed from the auxiliary air inlet openings 104, 106 to permit additional or auxiliary ambient air 116 into the convective cooling channel 48 through the auxiliary air inlet structure 102, as is further illustrated in FIG. 3.

In accordance with an aspect of the invention, the convective cooling channel 48 receives a non-forced ambient air through the main air supply inlet 84. That is, air may be provided to the convective cooling channel 48 without a driving or pressure force at the air inlet 84 to convey air in a convective main air supply flow 114 from a location outside the gas turbine engine through the main air supply inlet 84. The main air supply inlet 84 may be sized with a diameter to extend across at least a portion of each of the first and second channel portions 78, 82, such that a portion of the main supply air flow 114 may pass directly into each of the channel portions 78, 82.

The ambient air flow into the convective cooling channel 48 provides a decreased thermal gradient around the circumference of the exhaust section 10 to reduce or minimize thermal stresses that may occur with a non-uniform temperature distribution about the exhaust section 10. In particular, stresses related to differential thermal expansion of the exhaust case 14, and transmitted to the struts 34, may be decreased by the increased uniformity of the cooling flow provided by the convective cooling channel 48. Further, the operating temperature of the exhaust case 14 may be maintained below the material creep limit to avoid associated case creep deformation that may cause an increase in strut stresses.

A multiport cooling configuration may be provided for the convective cooling channel 48 by displacing or removing one or more of the cover plates 108, 110 of the auxiliary air inlet structure 102 to increase the number of convective cooling air supply locations. Hence, the amount of cooling provided to the channel portions 78, 82 may be adjusted on turbine engines located in the field to increase or decrease cooling by removal or replacement of the cover plates 108, 110. For example, it may be desirable to provide an increase in the cooling air flow by removing one or more of the cover plates 108, 110, or it may be desirable to provide a decrease in air flow by replacing one or more of the cover plates 108, 110 to prevent or decrease the auxiliary air flow 116, depending on increases or decreases in the ambient air temperature. Further, the cover plates 108, 110 may be used optimize the temperature of the exhaust case 14 and spool structure 16 to minimize any thermal mismatch between adjacent hardware and components.

The exhaust air outlet 86 is located at the top of the convective cooling channel 48, such that the heated exhaust air 118 may flow by convection out of the convective cooling channel 48. The exhaust air outlet 86 may be sized with a diameter to extend across at least a portion of each of the first and second channel portions 78, 82, such that the heated air exhausting from the convective cooling channel 48 may be conveyed directly to the exhaust air outlet 86 from each of the channel portions 78, 82. Subsequently, the heated air passing out of the exhaust air outlet 86 may be exhausted out of existing louver structure (not shown) currently provided for existing gas turbine engine units.

It should be understood that the convective air flow through the convective cooling channel 48 comprises a cooling air flow that may be substantially driven by a convective force produced by air heated along the outer case surface 68 and outer surface 80 of the spool structure 16. The heated air within the convective cooling channel 48 rises by natural convection and is guided toward the exhaust air outlet 86. As the air rises within the convective cooling channel 48, it draws ambient air into the channel 48 through the main cooling air supply inlet 84, effectively providing a driving force for a continuous flow of cooling air upwardly around the outer surface of the outer case 11. Similarly, when either or both of the auxiliary air inlet openings 104, 106 on the sides of the panel structure 72 are opened, natural convection will draw the air upwardly around the channel 48 through the auxiliary air inlet structure 102 to the exhaust air outlet 86.

It may be noted that as the cooling air flows upwardly as a convection air flow 48, a lower pressure will be created within the convective cooling channel 48 than the ambient air pressure outside the convective cooling channel 48. Hence, any leakage at the panel joints 98, or the joints 97, 99 (FIG. 2) where the edges of the panel segments 72*a* are mounted to the exhaust section 10 at the upstream and downstream locations 74, 76, will occur inwardly into the convection cooling channel 48. In this regard, it may be understood that it is not necessary to provide a leakage-proof sealing at the peripheral edges of the panel segments 72*a* and side portions 94, and that leakage into the convective cooling channel 48 may be viewed as an advantage facilitating the cooling function of the thermal barrier/cooling system 44.

Optionally, as is illustrated diagrammatically in FIG. 3, a fan unit 120 may be provided connected to the exhaust air outlet 86. The fan unit 86 may provide additional air flow from the exhaust air outlet 86 to increase the cooling capacity of the convective cooling channel 48, while maintaining an ambient airflow into and through the convective cooling channel 48. Alternatively, or in addition, an inlet fan unit (not shown) may be provided to the main cooling air supply inlet 84 to provide an increase in the ambient airflow into the channel 48. It should be understood that even with the provision of a fan unit to facilitate flow through the convective cooling channel 48, i.e., a fan unit 120 at the outlet 86 and/or a fan unit at the inlet 84, the movement of the air flow through the channel 48 may create a reduced pressure within the channel 48 relative to the ambient area surrounding the outside of the outer case 11.

Figure 4:
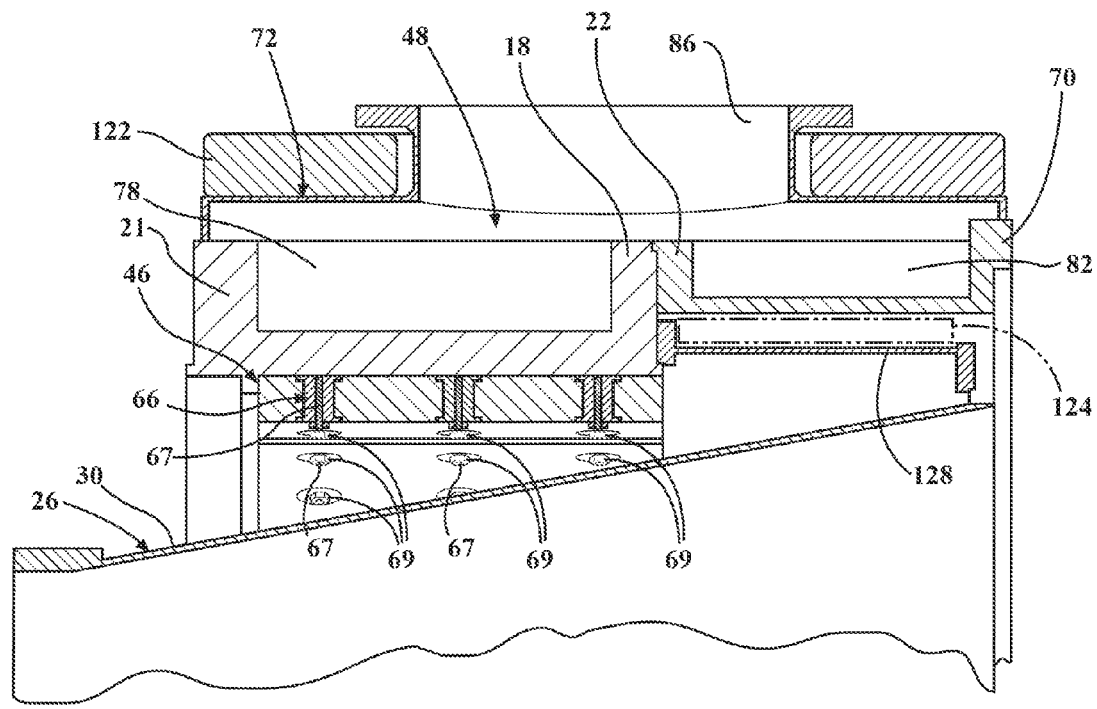
FIG. 4 is a cut-away perspective view of a portion of the exhaust section adjacent to a top-dead-center location of the exhaust section.

The convective cooling channel 48 may further be provided with an external insulating layer 122, as seen in FIGS. 1, 3, and 4 (not shown in FIG. 2). The external insulating layer may cover substantially the entire exterior surface of the panel structure 72 defined by the panel segments 72*a* and side portions 94, and has a low thermal conductivity to generally provide thermal protection to personnel working or passing near the exhaust section 10.

Referring to FIG. 4, an optional further or second internal insulating layer 124 may be provided to the spool structure 16, extending circumferentially around an inner spool segment surface 126, radially outwardly from a Z-plate or spring plate structure 128 provided for supporting the diffuser 26. The second internal insulating layer 124 may comprise separate insulating layer segments having a construction and thermal conductivity similar to that described for the internal insulating layer 46. Further, the second internal insulating layer 124 may be mounted to the inner spool segment surface 126 in a manner similar to that described for the insulating layer segments 46*a* of the internal insulating layer 46. The second internal insulating layer 124 may be provided to limit or minimize an amount of radiated heat transmitted from the diffuser 26 to the spool structure 16. Hence, the convective air flow requirement for air flowing through the second portion 82 of the convective cooling channel 48 may be reduced by including the second internal insulating layer 124.

As described above, the thermal barrier/cooling system 44 provides a system wherein the internal insulating layer 46 substantially reduces the amount of thermal energy transferred to the outer case 11 of the exhaust section 10, and thereby reduces the cooling requirement for maintaining the material of the outer case 11 below its creep limit. Hence, the external cooling configuration provided by the convective cooling channel 48 provides adequate cooling to the outer case 11 with a convective air flow, with an accompanying reduction or elimination of the need for forced air cooling provided to the interior of the outer case 11. Elimination of forced air cooling to the interior of the outer case 11, i.e., by maintaining supply and exhaust of cooling air external to the outer case 11, avoids problems associated with thermal mismatch or thermal gradients between components within the outer case 11.

Additionally, since the air supply for cooling the outer case 11 does not draw on compressor bleed air or otherwise directly depend on a supply of the air from the gas turbine engine, the present thermal barrier/cooling system 44 does not reduce turbine power, such as may occur with systems drawing compressor bleed air, and the cooling effectiveness of the present system operates substantially independently of the engine operating conditions. Hence, the present invention may be implemented without drawing on the secondary cooling air of the gas turbine engine, and may provide a reduced requirement for usage of secondary cooling air with an associated increase in overall efficiency in the operation of the gas turbine engine.

In accordance with an alternative aspect of the invention, the flow through the cooling channel 48 may be actively formed by using a source of sub-ambient pressure within the engine 10. In accordance with this aspect, and referring to FIGS. 6-10, the strut structure 32 further includes a shield structure comprising a radiation shield 35 surrounding each of the struts 34, located between the strut 34 and the strut shield or fairing 40. The radiation shield 35 and strut shield or fairing 40 define a shield structure providing thermal protection for the strut 34. A small strut shield gap 37 is defined by the radiation shield 35 and comprises an annular space between an outer surface of the strut 34 and an inner surface of the shield 35. The radiation shield 35 may be formed with dimples 39 (FIGS. 9 and 10) extending inwardly toward the strut 34 to locate the shield 35 at a predetermined spacing from the strut 34 and to avoid formation of vibration modes in the shield 35. The radiation shield 35 shields the strut 34 from radiated heat energy and, in accordance with an aspect of the invention, the strut shield gap 37 defines a cooling air flow path.

In particular, the strut shield gap 37 forms an air duct structure defining a cooling air path or passage extending radially inwardly along the strut 34 and radiation shield 35 from an inlet end at the inner case surface 42 to an outlet at a shield inner end 47 in fluid communication with an exit cavity, the exit cavity being defined by a reduced pressure region within the engine 10. In accordance with an aspect of the invention, the air path defined by the strut shield gap 37 comprises an air flow path in communication with a sub-ambient pressure internal to the engine for drawing a flow of ambient air into the channel 48. As may be seen in FIGS. 7, 8 and 10, the radiation shield 35 is formed with a flared radially outer end formed by flared wall portions 35*a* and 35*b* extending in opposing circumferential directions and extending through an annular space defined between the outer wall 30 of the duct 26 and the outer case 11. In addition, the flared portions 35*a*, 35*b* are joined by axially spaced end walls 35*c* and 35*d* to form an enclosed flow path between the outer wall 30 and the outer case 11, which enclosed flow path extends to the inner end 47 of the radiation shield 35.

Figure 8:
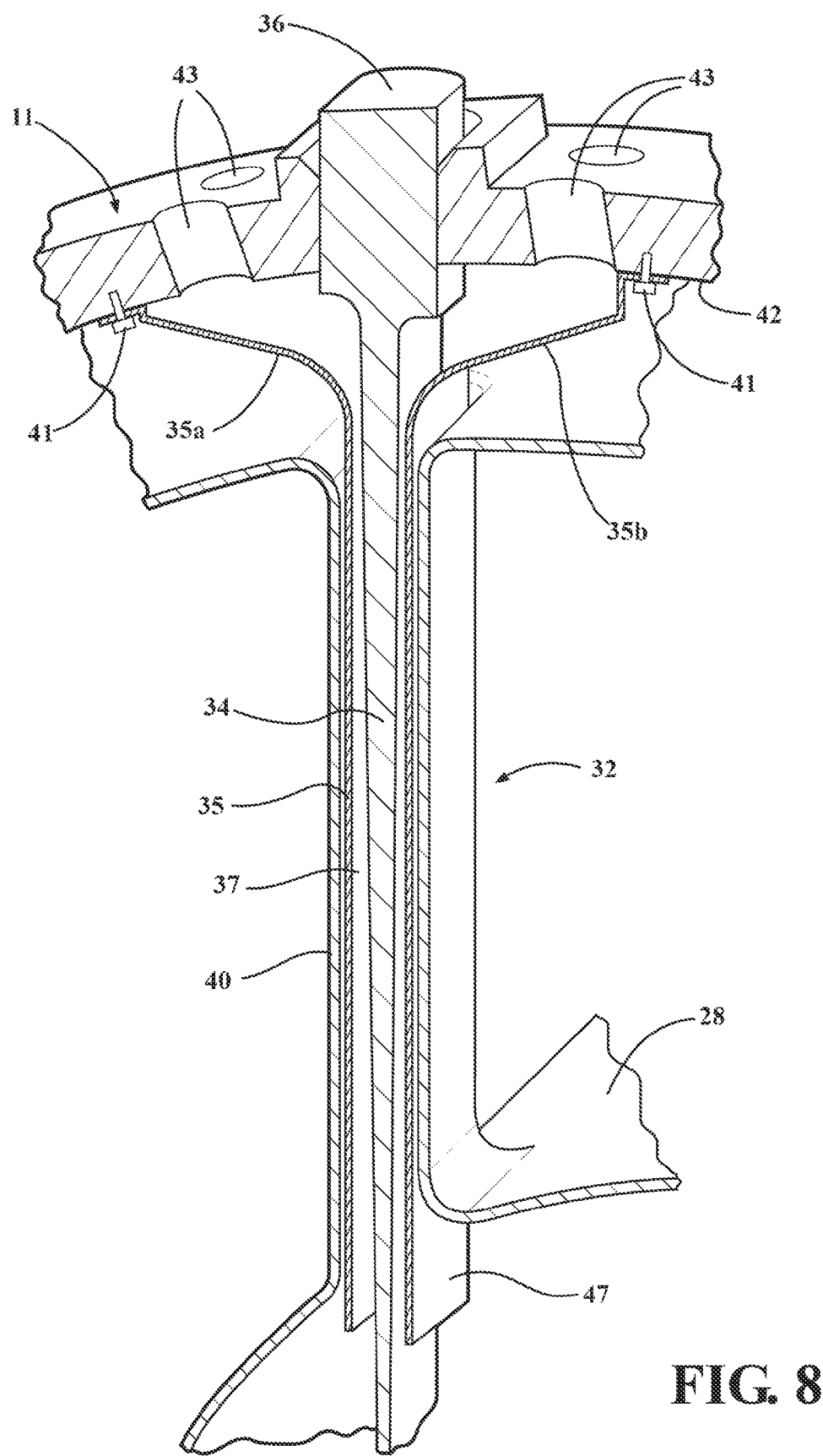
FIG. 8 is an enlarged cross-sectional view of a strut structure illustrated in FIG. 7.
Figure 12:
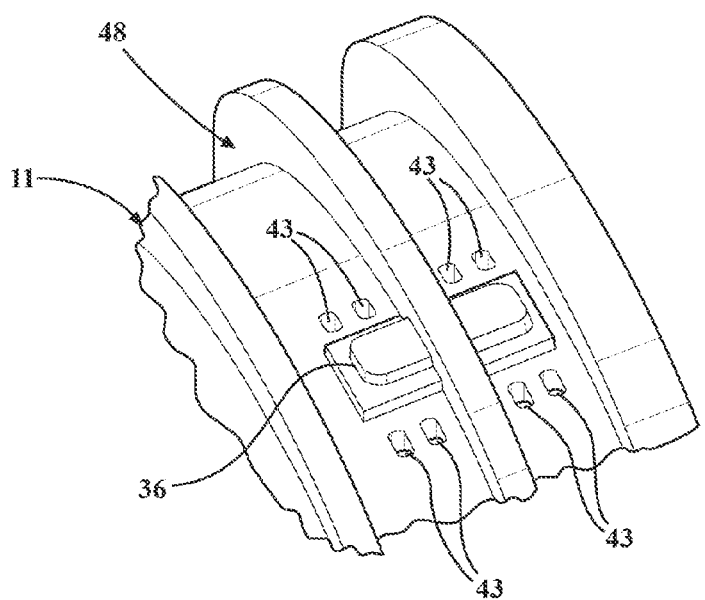
FIG. 12 is perspective view of a panel structure with insulation illustrating tabs forming gaps between sections of the panel structure.

As is best seen in FIG. 8, the radiation shield 35 is attached to the outer case 11, such as is illustrated by a plurality of fasteners 41 attaching the flared portions 35a, 35b to the inner case surface 42, substantially sealing the radially outer end of the radiation shield to the inner case surface 42. A plurality of case slots 43, i.e., through holes, are formed through the case 11 (FIG. 12), extending from the outer case surface 68 to the inner case surface 42, in the area sealed by the outer end of the radiation shield 35. The case slots 43 define air openings providing fluid communication between the cooling channel 48 and the strut shield gap 37.

The radiation shield 35 extends radially inwardly between the strut 34 and the fairing 40, and includes a shield inner end 47 that may be located radially inwardly from the inner wall 28 of the diffuser 26. The shield inner end 47 discharges ambient cooling air 49 into the exit cavity comprising an inner diameter or tunnel cavity 51 where the ambient cooling air 49 flows forwardly toward a rear disk cavity 57 located at a junction 65 between a last stage disk structure 59 of the turbine section 12 and an upstream end of the exhaust section 10. In particular, the rear disk cavity 57 is defined axially rearwardly of the disk structure 59 and axially forwardly of a radial seal structure or partition 61 extending radially from the bearing housing 24 to the inner wall 28 of the duct 26. It should be understood that the partition 61 may be formed by a plurality of segments located in side-by-side relation extending circumferentially within the engine 10, and that an outer end of the segments forming the partition 61 may each include a finger seal 61a, such as may have a resilient or spring-like characteristic for engaging a radial feature 61b on the inner wall 28 of the diffuser 26. An inner boundary of the disk cavity 57 is defined at an inner seal junction 63 between the rotor 25 and the bearing housing 24, and an outer boundary of the disk cavity 57 is defined by an axially forward portion of the inner wall 28 of the diffuser 26, extending up to a blade platform 59a of the last stage disk structure 59.

The segments forming the partition 61 are positioned such that non-fluid tight gaps are formed therebetween, including between adjacent finger seals 61a, such that fluid flow may occur from the tunnel cavity 51 to the rear disk cavity 57. And as a result of the rotation of the disk structure 59 the flow of exhaust gases 31 past the junction 65 air is extracted from the rear disk cavity 57, creating a reduced, sub-ambient pressure within the rear disk cavity 57. The sub-ambient pressure within the rear disk cavity 57 drives, i.e., draws or impels, flow of the ambient air 49 from the strut shield gap 37 toward the rear disk cavity 57. That is, the sub-ambient pressure at the rear disk cavity 57 creates a flow of ambient air 49 passing from the cooling channel 48, through the case slots 43 in the case 11, and radially inwardly through the strut shield gap 37 toward the shield inner end 47. The ambient air 49 flows through the partition 61, i.e., passes through the gaps in the partition 61 into the rear disk cavity 57.

It should be understood that any source, e.g., cavity, of sub-ambient pressure within the engine may be utilized for the present invention, to the extent that the sub-ambient pressure source is not provided at the expense of turbine power. Further, the passages described for connecting the ambient air path of the radiation shield 35, i.e., comprising paths through the partition 61, is provided as a general description for exemplary purposes, and may comprise any paths or passages for communicating a sub-ambient pressure to the inner end 47 of the radiation shield 35.

Figure 11:
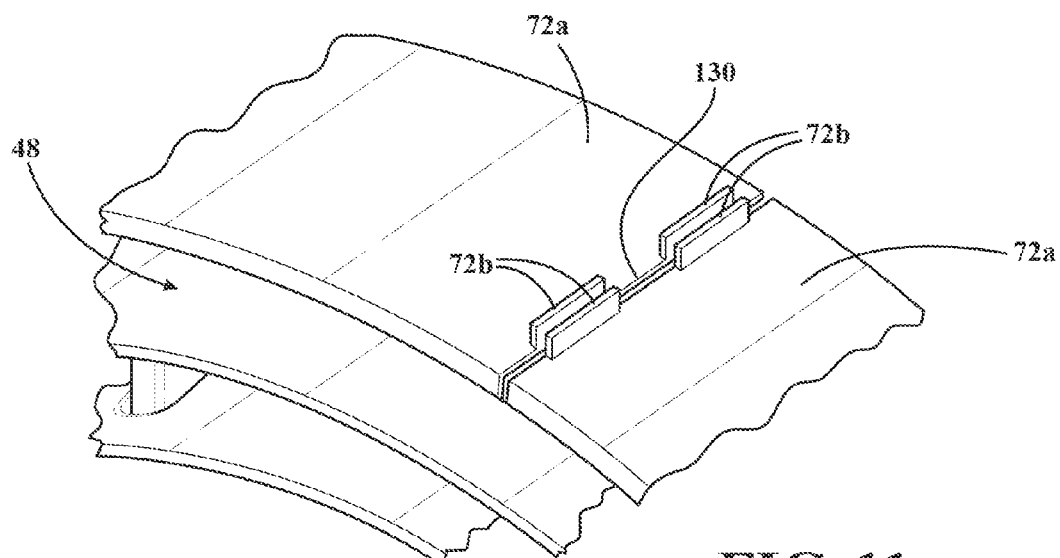
FIG. 11 is a perspective view of a portion of an outer surface of an outer case for the exhaust section, showing through holes for passage of ambient air into the case.

As the ambient air 49 flows radially inwardly through the strut shield gap 37 of each of the strut structures 32, the ambient cooling air is drawn through the cooling channel 48, circumferentially along the outer surfaces 68, 80 of the case 11, toward the case slots 43. In order to provide a flow of ambient air into the cooling channel, gaps may be formed in the panel and/or insulation structure forming the outer boundary of the cooling channel 48. In particular, as shown in FIG. 11, radially extending edge portions 72b of the panel structure 72 may be located at junctions 130 between adjacent panel sections 72a. The edge portions function to provide stops for positioning the edges of sections of the insulating layer 122 to maintain an axially extending opening or gap for passage of ambient air between adjacent sections of the insulating layer 122 placed on the panel sections 72a. The gaps formed at the junctions 130 between panel sections 72a permit ambient air to flow into the cooling channel 48 for passage along the outer surfaces 68, 80 of the case 11 and into the case slots 43. The locations of the panel sections 72a and associated junctions 130 may be selected such that, where possible, the junctions 130 are located circumferentially mid-way between the locations of the strut structures 32, such that ambient air passing into the cooling channel 48 through the junctions 130 will flow along a substantial portion of the outer surfaces 68, 80 to cool the case 11 as the air passes to the case slots 43. Subsequently, the ambient air passes radially inwardly to the rear disk cavity 57, as described above. Hence, the gaps at junctions 130 define a cooling channel inlet and the case slots 43 define a cooling channel outlet for segments of the cooling channel 48, wherein the plurality of the cooling channel segments form the continuous channel 48 located around the outer circumference of the case 11.

In addition to providing a flow of ambient air for cooling the outer surfaces 68, 80 of the case 11, the ambient air passing into the strut shield passages 37 forms a cooling air barrier around the struts 34 to provide additional thermal protection for the struts 34. Hence, the sub-ambient pressure in the cavity 57 is used to actively drive the flow of ambient air for cooling both the case 11 and for providing a protective cooling flow to the strut structure 34 without extracting energy from the engine to drive the air flow, such as through use of compressor bleed air.

It should be understood that the aspects of the invention utilizing sub-ambient pressure to draw the ambient air through the cooling channel 48 and radially inwardly along the struts 34 may be used with any of the aspects of the external insulating layer 122 and internal insulating layers 46, 124 described above.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gas turbine engine comprising:
   an outer case comprising a turbine exhaust case defining a central longitudinal axis, the exhaust case having an upstream exhaust flange, a downstream exhaust flange, and an outer surface between the upstream and downstream exhaust flanges, the upstream and downstream exhaust flanges extending radially outward from the outer surface of said exhaust case, the outer case comprising a spool structure comprising an upstream spool flange attached to the downstream exhaust flange, a downstream spool flange, and an outer surface between the upstream and downstream spool flanges, the upstream and downstream spool flanges extending radially outward from the outer surface of said spool structure, the outer surface of said outer case defined by the outer surfaces of exhaust case and the spool structure and extends circumferentially around the central longitudinal axis;

an exhaust gas passage defined within the outer case, the exhaust gas passage including an outer duct wall and an inner duct wall forming an annular passage and located radially inward from the outer case for conducting an exhaust gas flow from a turbine section of the gas turbine engine;

a cooling channel associated with the outer surface of said outer case, said cooling channel having a channel inlet and a channel outlet;

a panel structure extending circumferentially around said outer case and comprising an upstream end affixed at the upstream exhaust flange and downstream end affixed at the downstream spool flange, said panel structure is radially spaced away from said outer surface to define said cooling channel between the panel structure and the outer case;

an air duct structure including an inlet end in fluid communication with said channel outlet and an outlet end in fluid communication with an area of reduced pressure relative to said air duct structure inlet end; and an exit cavity at said air duct structure outlet end, said exit cavity effecting a reduced pressure at said outlet end to draw air from said cooling channel into said air duct, wherein ambient air passes through said panel structure and enters said cooling channel, and wherein said panel structure comprises plural panel sections with axially extending gaps defined between adjacent panel sections at spaced circumferential locations, said gaps permitting passage of ambient air into said cooling channel.

2. The gas turbine engine of claim 1, wherein said air duct structure comprises a passage extending from an inner surface of said outer case to a location of said exit cavity radially inwardly of said exhaust gas passage.

3. The turbine engine of claim 2, including a strut extending radially inward from said inner surface of said outer case, and said air duct structure is defined by a radiation shield extending around said strut and attached to said inner surface of said outer case.

4. The gas turbine engine of claim 3, including openings through said outer case defining said cooling channel outlet for conducting ambient air from said outer surface of said outer case to said air duct structure.

5. The gas turbine engine of claim 1, including openings through said outer case defining said cooling channel outlet for conducting ambient air from said outer surface of said outer case to said air duct structure.

6. The gas turbine engine of claim 1, including a thermal barrier/cooling system for controlling a temperature of the outer case, said thermal barrier/cooling system including:

an internal insulating layer supported on an inner surface of said outer case opposite said outer surface of said outer case, the internal insulating layer extending circumferentially along said inner surface of said outer case and providing a thermal resistance to radiated energy from said exhaust gas passage located radially inwardly from said outer case; and said cooling channel being generally axially aligned with said internal insulating layer and forming a flow path for an ambient air flow cooling said outer surface of said outer case.

7. The gas turbine engine of claim 6, including an external insulating layer supported on and covering said panel structure.

8. The gas turbine engine of claim 6, including an exhaust diffuser defining said exhaust gas passage at said axial location of said internal insulating layer.

9. A gas turbine engine including an exhaust section comprising:

an outer case defining a central longitudinal axis, and an outer case having an upstream flange and a downstream flange and an exterior surface extending circumferentially between the upstream and downstream flanges around the central longitudinal axis, the upstream and downstream flanges extending radially outward from the exterior surface of said outer case;

a panel structure extending circumferentially around said outer case and having upstream and downstream ends affixed to said exhaust section, said panel structure is radially spaced away from said exterior surface to define a cooling channel and said exterior surface; an exhaust duct located within said outer case and defined between an outer duct wall and an inner duct wall, said exhaust duct defining a passage for hot exhaust gases flowing in an axially downstream direction and exiting a turbine section of said gas turbine engine;

a rear bearing housing located radially inward from said inner duct wall;

a strut extending from said outer case to said bearing housing;

a shield structure surrounding said strut to shield said strut from said exhaust gases;

an air opening formed through said outer case exterior surface in fluid communication with said cooling channel, said air opening being in fluid communication with a radial passage extending between said strut and a portion of said shield structure; and a disk cavity located adjacent a stage of said turbine section and in fluid communication with said radial passage, said disk cavity being at a pressure lower than an ambient air pressure outside of said turbine engine for effecting a flow of ambient air through said air opening into said disk cavity, wherein ambient air entering said air opening passes through said panel structure and into said cooling channel, and wherein said cooling channel extends circumferentially around said outer case, and said panel structure comprises plural panel sections with axially extending gaps defined between adjacent panel sections at spaced circumferential locations, said gaps permitting passage of ambient air into said channel.

10. The gas turbine engine of claim 9, wherein said shield structure includes a strut shield surrounding said strut and a radiation shield located between said strut shield and said strut.

11. The gas turbine engine of claim 10, wherein said radial passage is defined by an interior surface of said radiation shield and an exterior surface of said strut.

12. The gas turbine engine of claim 11, wherein said radiation shield extends through an annular space defined between said outer duct wall and said outer case.

13. The gas turbine engine of claim 12, wherein said radiation shield includes a radially outer end attached to an interior surface of said outer case and surrounding said air opening.

14. The gas turbine engine of claim 9, including a tunnel cavity defined radially inward from said inner duct wall and located in the axial downstream direction from said disk cavity, said tunnel cavity receiving said ambient air prior to said ambient air entering said disk cavity.

15. The gas turbine engine of claim 9, including a thermal barrier/cooling system for controlling a temperature of the outer case, said thermal barrier/cooling system including:
- an internal insulating layer supported on an inner surface of said outer case opposite said outer surface of said outer case, the internal insulating layer extending circumferentially along said inner surface of said outer case and providing a thermal resistance to radiated energy from said exhaust gas passage located radially inwardly from said outer case; and
- said cooling channel being generally axially aligned with said internal insulating layer and forming a flow path for an ambient air flow cooling said outer surface of said outer case.

16. The gas turbine engine of claim 15, including an external insulating layer supported on and covering said panel structure.

17. The gas turbine engine of claim 15, including an exhaust diffuser defining said exhaust gas passage at said axial location of said internal insulating layer.

18. A gas turbine engine comprising:
- an outer case defining a central longitudinal axis, and the outer case defining an surface extending circumferentially around the central longitudinal axis;
- an exhaust gas passage defined within the outer case for conducting an exhaust gas flow from a turbine section of the gas turbine engine;
- a cooling channel defined between the outer surface of said outer case and a panel structure supported on said outer case, said cooling channel having a channel inlet and a channel outlet;
- said panel structure comprises plural panel sections with axially extending gaps defined between adjacent panel sections at spaced circumferential locations, said gaps permitting passage of ambient air into said cooling channel;
- an air duct structure including an inlet end in fluid communication with said channel outlet and an outlet end in fluid communication with an area of reduced pressure relative to said air duct structure inlet end; and
- an exit cavity at said air duct structure outlet end, said exit cavity effecting a reduced pressure at said outlet end to draw air from said cooling channel into said air duct.

\* \* \* \* \*